United States Patent [19]
Tanaka et al.

[11] 3,963,803
[45] June 15, 1976

[54] ANTISTATIC ACRYLIC FIBER

[75] Inventors: Hiroyoshi Tanaka; Haruo Obara; Teruo Koseki; Hajime Machida; Michihiko Tanaka; Shigeru Fujii, all of Ehime, Japan

[73] Assignee: Toray Industries, Inc., Tokyo, Japan

[22] Filed: Sept. 24, 1973

[21] Appl. No.: 400,207

[30] Foreign Application Priority Data
Sept. 26, 1972  Japan.............................. 47-95734
Mar. 8, 1973  Japan.............................. 48-26623

[52] U.S. Cl............................ 260/873; 260/DIG. 17
[51] Int. Cl.²........................................ C08G 39/10
[58] Field of Search............. 260/873, 860, 88.7 B, 260/DIG. 17, DIG. 18, 75

[56] References Cited
UNITED STATES PATENTS 3,598,882  8/1971  Brinkmann et al................. 260/873
3,627,733  12/1971  Ioka et al...................... 260/88.7 X
3,634,545  1/1972  Engelhard et al................. 260/873

*Primary Examiner*—Melvyn I. Marquis
*Assistant Examiner*—T. Pertilla

[57] ABSTRACT

An acrylic fiber having excellent antistatic properties is obtained by mixing a polymer (A) consisting mainly of acrylonitrile with a copolymer (B) consisting mainly of a polyetherpolyester block copolymer consisting of a polyester and compound represented by the general formula (1):

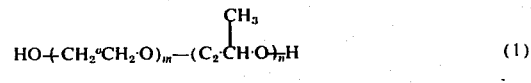

(1)

(wherein each of $m$ and $n$ is 0 or a positive integer, wherein $25 \leq m + n \leq 1000$, and $m \geq 10$).

5 Claims, No Drawings

ANTISTATIC ACRYLIC FIBER

The present invention relates to an antistatic acrylic fiber. More in particular, the present invention relates to an antistatic acrylic fiber obtained by non-uniformly mixing an ordinary acrylic polymer with an antistatic polymer.

In general, acrylic fibers have excellent characteristics in shrinkability, dimensional stability, light resistance and high dyeability. On the other hand, they have very poor hygroscopic and antistatic properties. Therefore, when such fibers have been used in making clothing or carpet, the product has had an extremely unpleasant feel due to generation and accumulation of static electricity. Otherwise, acrylic fibers would be excellent for clothing and for interior uses.

In order to achieve such an object, various methods have heretofore been proposed, some of which have been put to practical use, but in all of which there is room for improvement. For example, a blend of a copolymer composed of polyalkylene glycol acrylate and an ordinary acrylonitrile copolymer has had a significant disadvantage in that the filterability and spinnability of the mixed spinning solution as well as the dimensional stability and luster of the final product are quite inferior.

As a result of studies, it has been surprisingly found that an acrylic fiber having excellent antistatic properties can be obtained, without losing the inherent characteristics of acrylic fibers, from a composition consisting of an ordinary acrylic polymer and a particular polyether-polyester block copolymer.

According to the present invention, we have created an antistatic acrylic fiber consisting of a polymer composition, by blending a polymer (A) consisting of polyacrylonitrile only, or a copolymer containing at least about 60 mol % of acrylonitrile and at least one of other copolymerizable vinyl monomer, with a copolymer (B) consisting of about 60–95% by weight of a compound represented by the general formula (1) and about 5–40% by weight of polyester, so that the amount of said compound represented by the general formula (1) in said copolymer (B) becomes about 0.3–10% by weight of the entire mixture. Formula (1) is as follows:

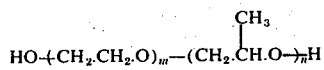  (1)

(wherein each of $m$ and $n$, but not both, is 0 or a positive integer, $25 \leq m + n \leq 1000$, and $m \geq 10$).

The polymer (A) according to the present invention comprises acrylonitrile only, or a copolymer containing at least about 60 mol % of acrylonitrile and at least one other copolymerizable vinyl monomer, which is polymerized according to a known method of polymerization.

As the other monomers which can be copolymerized with acrylonitrile, for example, acrylic acid, methacrylic acid or alkyl substitutes thereof; α-substituted, β-substituted and nucleus substituted styrene; vinyl carboxylates such as vinyl chloride, vinylidene chloride, vinyl acetate, vinyl benzoate and vinyl chloroacetate; pyridine compounds such as 2-vinyl pyridine and 2-methyl-5-vinyl pyridine or alkyl substitutes thereof; N,N-dimethylamino methyl methacrylate, N,N-diethylamino ethyl methacrylate, alkenyl aromatic sulfonic acid, vinyl sulfonic acid, allyl sulfonic acid, methallyl sulfonic acid and salts thereof is used.

The copolymer (B) consisting mainly of a polyether-polyester block copolymer is an antistatic component consisting mainly of a block copolymer of about 60–95% by weight of a compound represented by the general formula (1) and about 5–40% by weight of a polyester, which is intended to include the polyether-polyester block copolymer alone or the product obtained by graft- or block-copolymerizing other copolymerizable vinyl monomers within such a range that the antistatic effect on the polyether-polyester block copolymer is not damaged.

The weight ratio of the compound represented by the general formula (1) to the polyester is very important. When the ratio is less than about 60% by weight of the polyether-polyester block copolymer, the copolymer is hardly soluble in the solvent for said polymer (A) which usually consists of dimethyl sulfoxide, dimethyl formamide or dimethyl acetamide, and spinnability of the mixed spinning solution is drastically impeded. On the other hand, when the amount of the compound of formula (1) exceeds about 95% by weight of the block copolymer, the antistatic component is apt to be soluble in hot water, and the antistatic effect of the product is maintained only temporarily.

On the other hand, the ratio of polyester in the polyether-polyester block copolymer is regulated for a similar reason.

Compounds represented by the general formula (1), include, for example, polyethylene glycol together with a block or random copolymer of polyethylene glycol and polypropylene glycol. As to the molecular weight of said compound, when $m + n$ is at least about 25, the antistatic effect is developed, however, when the molecular weight is too high, the solubility in the solvent and compatibility with said polymer (A) are reduced. Therefore, it is necessary to make the sum of $m + n$ at most about 1000, and as an expecially preferable range of $m + n$ is about 50–500.

As polyesters, those that are linear and saturated, for example, polyethylene terephthalate, polyethylene adipate, polybutylene adipate, polybutylene terephthalate, polybutylene isophthalate, polyethylene azelate, polyethylene sebacate, polyethylene decandicarboxylate, polybutylene azelate, polybutylene sebacate, polyethylene terephthalate/adipate, polybutylene isophthalate/adipate, polyethylene adipate/azelate, polyethylene adipate/sebacate and polyethylene adipate/azelate/sebacate are used. As compared to polyesters obtained from aromatic dicarboxylic acids, we especially prefer an aliphatic polyester prepared from aliphatic acids or diols such as polyethylene adipate, polybutylene adipate, polyethylene azelate, polybutylene azelate, polyethylene sebacate, polybutylene sebacate, polyethylene adipate/azelate, polyethylene adipate/sebacate and polyethylene adipate/azelate/sebacate. Especially when the main body of the acid component of polyester is one or more acids selected from the group consisting of adipic acid, azelaic acid and sebacic acid, excellent antistatic properties are obtained. These polyesters may be copolymerized further with a small amount of other acid components (including salt or ester), or glycol components.

It is considered that excellent antistatic properties are obtained by using polyesters employing these aliphatic acid components because these polyesters have poor crystallinity as compared, for example, with polyethylene terephthalate and polybutylene terephthalate, and obstruct the crystallization of polyethylene glycol (PEG) thereby to facilitate the movement of molecules of the polyether-polyester block copolymer.

Such compounds represented by general formula (1), together with such polyesters, are formed into a polyether-polyester block copolymer by polycondensation with heating. Although the polyester may be an ordinary one, it is preferable that the polyester be a low molecular weight polymer, from the viewpoint of easy reaction with the compound represented by the general formula (1). Generally, the compound represented by the general formula (1) is reacted with an intermediate product obtained at the time of synthesizing the polyester, namely, polyester (a) obtained by the esterification or by an ester interchange reaction of the acid component with the glycol component, or a low polymer of said polyester (a).

By mixing the resulting polyether-polyester block copolymer as copolymer (B) with the polymer (A), an antistatic fiber can be obtained. However, a further effective embodiment is to use the product obtained by graft-copolymerizing copolymerizable vinyl monomers consisting mainly of acrylonitrile on said polyether-polyester block copolymer, for reasons which will be given in further detail hereinafter.

The product which is obtained by graft copolymerizing the vinyl monomer consisting mainly of acrylonitrile on the polyether-polyester block copolymer, has better compatibility with the polymer (A) than that of the polyether-polyester block copolymer alone, upon being mixed with the acrylic polymer (A). The polyether-polyester block copolymer which is an antistatic component is easily extended as long stripes in the polymer (A) at the time of spinning. The satisfactory antistatic properties are given by smaller amount of said polyether-polyester block copolymer than the known antistatic components.

We refer now to the method of graft copolymerizing the copolymerizable vinyl monomer consisting mainly of acrylonitrile on the polyether-polyester block copolymer. This method comprises dissolving the polyether-polyester block copolymer in a common solvent with acrylonitrile, throwing acrylonitrile into the resulting solution so that the amount of acrylonitrile becomes about 5–60 parts by weight per 100 parts by weight of the polyether-polyester block copolymer, and graft copolymerizing acrylonitrile in the presence of peroxide or azonitrile type catalysts in a nitrogen atmosphere.

A peroxide type catalyst, for example, ammonium persulfate is preferable as a polymerization catalyst, from the viewpoint of grafting efficiency.

The charge ratio of acrylonitrile to the polyether-polyester block copolymer is preferably about 5–60 parts by weight per 100 parts by weight of the polyether-polyester block copolymer. Especially within the range of 5–60 parts of AN based on 100 parts of the polyether-polyester block copolymer, excellent antistatic properties are given because of the moderate affinity of the resulting graft copolymer with the acrylic polymer (A).

In order to improve other characteristics, it is permissible to copolymerize with the foregoing product a small amount of another copolymerizable vinyl monomer, for example, methyl acrylate, vinyl acetate, methyl methacrylate and sodium allylsulfonate (SAS).

We refer now to the method of polymerization. Solution polymerization is preferable. It comprises polymerizing the polyether-polyester block copolymer and acrylonitrile in a solvent for both said copolymer and acrylonitrile. Dimethyl sulfoxide, dimethyl formamide and dimethyl acetamide are suitable solvents.

The resulting polymer (A) and copolymer (B) consisting mainly of the polyether-polyester block copolymer are continuously mixed. However, in order to obtain an excellent antistatic effect in accordance with the present invention, it is indispensable to maintain both as a non-uniform mixture.

Specifically, the copolymer (B) in accordance with the present invention is so mixed that it may be dispersed in the form of long and slender particles in the resulting fiber.

For that purpose, it is necessary that the copolymer (B) should have some degree of polymerization and solubility in the solvent and in this connection, it is preferable that the copolymer (B) should ordinarily have a specific viscosity $[\eta_{SP/C}]$ of about 1.5–2.8 in its 1% by weight solution, measured at 25°C in dimethyl sulfoxide as a solvent.

When the copolymer (B) exists as an independent dispersed phase in the spinning solution having proper affinity for the acrylic polymer (A), it is drawn into long and slender formations in the coagulation and drawing steps, and dispersed as long and slender particles having a ratio of diameter to length of the copolymer (B) is at least 10 in the fiber. As a result a very satisfactory effect is achieved.

Further, upon mixing the polymer (A) with the copolymer (B), it is necessary to provide about 0.3–10% by weight, of the compound represented by general formula (1) in said copolymer (B). Preferably this amount is about 0.5–4% by weight of the entire mixture. When the amount of the compound represented by the general formula (1) is less than about 0.3% by weight, a satisfactory antistatic effect cannot be obtained. On the other hand, when such amount exceeds about 10% by weight, the fiber has undesirable feel or "hand".

Upon spinning the resulting spinning solution consisting of the mixed polymer, any of the known dry and wet spinning methods is applicable. The wet spinning method, using an organic solvent — aqueous coagulating bath, is especially preferred.

We have found that a mixed polymer of an acrylic polymer (A) and a copolymer (B) consisting mainly of the specified polyether-polyester block copolymer is highly advantageous as a fiber. Indeed, the fiber of the present invention has great utility; the valuable properties and characteristics of acrylic fibers together with excellent antistatic properties and excellent durability are simultaneously obtained.

The invention will be further illustrated by the following examples, in which all parts are by weight unless otherwise indicated.

EXAMPLE 1

Acrylic polymer solution ($A_1$) was prepared according to the following process. 22 parts (by weight) of a mixture containing 94.5 mol % of acrylonitrile (AN), 5.2 mol % of methyl acrylate (MA), 0.3 mol % of sodium allylsulfonate (SAS), 0.1 part (by weight) of azo-bis-dimethyl valeronitrile, 1 part (by weight) of water and 0.06 parts (by weight) of dodecyl mercaptan (DM) were dissolved in 76 parts (by weight) of dimethyl sulfoxide (DMSO) in a polymerization vessel, and the pH of the resulting solution was adjusted to 9 by adding sulfuric acid.

Polymerization of this mixture was carried out by heating at a temperature of 50°C for 24 hours with mechanical agitation. The polymer content of the polymer solution thus obtained was 20.2% by weight.

On the other hand, a batchwise esterification apparatus was charged with 75 parts of terephthalic acid (TPA), 82 parts of 1,4-butane diol and 0.03 parts of tetraisopropyl titanate, and an esterification reaction was carried out at 200°–230°C for 3 hours. 23 parts of the reaction product was transferred to a polycondensation reactor, to which product were added 80 parts of PEG (number average molecular weight about 20,000) and 0.03 parts of tetraisopropyl titanate and a polycondensation reaction was carried out at 250°C for 5 hours under a reduced pressure of 0.1–1 mm Hg to obtain a polyether-polyester block copolymer ($B_1$) consisting of polybutylene terephthalate and PEG.

Except for using isophthalic acid and sebacic acid, respectively instead of said TPA, said esterification reaction and polycondensation reaction were repeated to obtain polyether-polyester block copolymers ($B_2$), ($B_3$).

Each of these polyether-polyester block copolymers ($B_1$), ($B_2$) and ($B_3$) was blended with a polyacrylonitrile type polymer solution ($A_1$) to prepare spinning solutions. At this time, the amount of PEG component in the entire polymer was 2% by weight, in each of these spinning solutions.

Each of these spinning solution was extruded through a spinneret having 400 orifices each having a diameter of 0.07 mm and solidified in a 50% by weight aqueous solution of DMSO. This was drawn and stretched to 6.5 times its original length in an aqueous solution containing 30% by weight of DMSO at a temperature of 98°C. The fibers thus obtained were next washed with water and dried for 2 minutes at 165°C.

Antistatic properties were determined with respect to the resulting tows by the following test methods. The results are shown in the following table.

MEASUREMENT OF ANTISTATIC PROPERTIES

The electrical resistance in ohms of a tow sample 10 cm long, 20,000 denier, is measured by securing it between two terminal clamps, spaced approximately 10 cm away from an ohm-meter in air at 43% relative humidity and at a temperature of 23°C.

The resulting value for resistance (R) is converted to electrical resistivity by the following equation.

$$\text{Electrical resistivity} = \frac{R \times \text{denier}}{9 \times 10^6 \times \text{specific gravity}}$$

MEASUREMENT OF ANTISTATIC DURABILITY

The tow samples are washed 10 times using an electric washer under the following conditions.
Laundering solution: 3g/l anionic surface active agent
Bath ratio: 1 : 40
Bath temperature: 40°C
Time: laundering 30 minutes, rinsing 5 minutes.

The sample is dried overnight in a vacuum drier, left to stand in a room at a temperature of 23°C and at a relative humidity of 43%, for 1 day.

Table 1

| Product No. | Polyether-Polyester Block Polymer No. | $\eta SP/C$ | Washing | Electrical Resistivity ($\Omega$cm) |
|---|---|---|---|---|
| Control | — | — | before | $3.2 \times 10^{13}$ |
|  |  |  | after | $2.5 \times 10^{13}$ |
| $D_1$ | $B_1$ | 2.1 | before | $3.1 \times 10^9$ |
|  |  |  | after | $2.3 \times 10^9$ |
| $D_2$ | $B_2$ | 1.7 | before | $3.9 \times 10^9$ |
|  |  |  | after | $2.7 \times 10^9$ |
| $D_3$ | $B_3$ | 1.9 | before | $2.1 \times 10^9$ |
|  |  |  | after | $1.7 \times 10^9$ |

This specific viscosity of the polyether-polyester block copolymer is determined from the relative viscosity. The relative viscosity of a DMSO solution containing the copolymer in an amount of 1% by weight based on the weight of the solution is measured by an Ostwald viscometer at a temperature of 25°C, and the specific viscosity is calculated from the value of the relative viscosity ($\eta_r$) using the equation:

$$\eta_{sp} = \eta_r - 1$$

EXAMPLE 2

Substantially following the procedure described in Examiner 1, polyether-polyester block copolymer was prepared from the following materials:

| Polyethylene terephthalate (PET) prepolymer | |
|---|---|
| ⎡ TPA | 100 parts |
| ⎣ Ethylene glycol | 220 parts |
| Polyether-polyester block copolymer | |
| ⎡ PET prepolymer | 12 parts |
| ⎢ PEG (molecular weight about 4,000) | 80 parts |
| ⎣ Ethylene glycol titanate | 0.05 parts |

10 parts of the resulting polyether-polyester block copolymer ($B_4$) were dissolved in 87 parts of DMSO. The resulting solution was added to 3 parts of AN, 10 mmol/kg of ammonium persulfate (APS) and 0.06 parts of DM and the resultant mixture was graft copolymerized in DMSO at 45°C for 25 hours.

The specific viscosity of the resulting graft copolymer ($B_4'$) solution was 2.2 and the residue of boiling water of said solution was 10.83%.

The resulting graft copolymer ($B_4'$) and the polyether-polyester block copolymer ($B_4$) were blended with acrylonitrile copolymer (A) and spun by a method like that in Example 1.

The resulting mix spun fiber was washed and the antistatic properties of the fiber were measured, and the results are shown in Table 2.

Table 2

| Antistatic master polymer | Blending ratio of PEG (%) | Electrical Resistivity ($\Omega$cm) |
|---|---|---|
| $B_4$ (polyether-polyester block copolymer) | 2 | $3.2 \times 10^9$ |
| $B_4$ grafted PAN on | 2 | $9.8 \times 10^8$ |
| $B_4$ grafted PAN on | 1.5 | $2.3 \times 10^9$ |
| $B_4$ grafted PAN on | 1 | $6.2 \times 10^9$ |

PAN: polyacrylonitrile

From the above results, it is understood that copolymers obtained by grafting polyacrylonitrile on a polyether-polyester block copolymer show further excellent antistatic properties.

EXAMPLE 3

Varying m and n of the compound represented by the general formula (1), using a PET prepolymer obtained in Example 2 and by the method of Example 2, block copolymerization and graft copolymerization were carried out to obtain graft copolymers ($B_5'$)–($B_{13}'$).

Each of these graft copolymers was blended with 2% by by weight of PEG, the resultant mixture was mix spun with the polymer solution ($A_1$) and the antistatic properties of the resulting fiber were measured by the method of Example 2. The results obtained are shown in Table 3.

Table 3

| Graft Copolymer | Compound of the formula (1) m | n | m + n | Electrical resistivity (Ω cm) | Degree of coloration of fiber |
|---|---|---|---|---|---|
| $B_5'$ | 20 | 0 | 20 | $2.8 \times 10^{10}$ | 6.8 |
| $B_6'$ | 25 | 0 | 25 | $2.3 \times 10^9$ | 6.2 |
| $B_7'$ | 100 | 0 | 100 | $9.7 \times 10^8$ | 6.2 |
| $B_8'$ | 1000 | 0 | 1000 | $3.1 \times 10^9$ | 6.3 |
| $B_9'$ | 1500 | 0 | 1500 | $5.0 \times 10^{10}$ | 8.5 |
| $B_{10}'$ | 100 | 20 | 120 | $1.3 \times 10^9$ | 9.7 |
| $B_{11}'$ | 15 | 10 | 25 | $2.1 \times 10^9$ | 8.7 |
| $B_{12}''$ | 10 | 15 | 25 | $5.3 \times 10^9$ | 9.6 |
| $B_{13}'$ | 5 | 20 | 25 | $7.3 \times 10^{10}$ | 13.2 |

The degree of coloration was measured as follows: the fibers were carefully unravelled and the unravelled fibers were subjected to measurement of the reflection rate measurement at 570 mμ and 430 mμ using Shimazu's Automatic Recording Spectrophotometer. The difference between the values of the reflection rates indicates the degree of coloration. A larger degree of coloration indicates greater coloration and this value is agreeable with the results of observation by the naked eye.

From the foregoing results, it is understood that when m and n of the compound represented by the general formula (1) satisfy the conditions of $25 \leq m + n \leq 1000$ and $m \geq 10$, it is preferable from the viewpoint of coloration and antistatic properties.

EXAMPLE 4

By a method roughly the same as that of Example 1, prepolymers of various polyesters were synthesized.

Each of these prepolymers and PEG (molecular weight about 4,000) were copolymerized under the following conditions to obtain polyether-polyester block copolymers ($B_{14}$)–($B_{24}$).

The polymerization conditions were:
Polyester/polyethylene glycol: (20/80) % by weight
Ethylene glycol titanate: 0.03 % by weight
230°C, 5 hours
0.1–1 mm Hg Each of the so obtained polyether-polyester block copolymers ($B_{14}$)–($B_{24}$) were graft copolymerized under conditions the same as those in Example 2 to obtain graft copolymers ($B_{14}'$)–($B_{24}'$).

Each of these graft copolymers was blended and spun with the polymer ($A_1$) solution obtained in Example 1 so that the amount of PEG was 2% by weight based on the entire mixed polymer.

Each of the tows produced was washed by the method of Example 1 and the antistatic properties were measured as in Example 1. The results are reported in Table 4.

Table 4

| Graft Copolymer | Polyester Prepolymer | Electrical Resistivity (Ω cm) |
|---|---|---|
| $B_{14}'$ | PET | $1.5 \times 10^9$ |
| $B_{15}'$ | Polyethylene isophthalate | $9.1 \times 10^8$ |
| $B_{16}'$ | Polybutylene isophthalate | $9.8 \times 10^8$ |
| $B_{17}'$ | Polyethylene decandicarboxylate | $5.3 \times 10^8$ |
| $B_{18}'$ | Polyethylene sebacate | $3.2 \times 10^8$ |
| $B_{19}'$ | Polyethylene azelate | $1.5 \times 10^8$ |
| $B_{20}'$ | Polyethylene adipate | $1.7 \times 10^8$ |
| $B_{21}'$ | Polybutylene adipate (PBA) | $1.5 \times 10^8$ |
| $B_{22}'*$ | Polyethylene adipate/azelate | $1.3 \times 10^8$ |
| $B_{23}'*$ | Polyethylene adipate/sebacate | $1.9 \times 10^8$ |
| $B_{24}'*$ | Polyethylene azelate/sebacate | $2.7 \times 10^8$ |

Note:
*an equimolar amount of a dicarboxylic acid was concurrently used.

From the foregoing results, it will be understood that when polyether-polyester block copolymers consisting of aliphatic polyesters were used, especially when one or more acids selected from the group consisting of adipic acid, azelaic acid and sebacic acid were used as the dicarboxylic acid, excellent antistatic properties are obtained.

EXAMPLE 5

Varying the composition ratio of a prepolymer of polybutylene adipate (PBA) obtained in Example 4 to PEG having a molecular weight of 4,000, polycondensation was carried out under the conditions of Example 4.

The charged composition ratios of PBA to PEG at this time were as shown in Table 5 and polyether-polyester block copolymers $B_{25}$–$B_{30}$ were obtained.

100 parts of each of these copolymers $B_{25}$–$B_{30}$ were dissolved in 875 parts of DMSO. To the resulting solution were added 10 mmol/kg of APS and 25 parts of AN and each of the resulting mixtures was graft copolymerized at 50°C for 20 hours.

Each of the resulting graft copolymer solutions $B_{25}'$–$B_{30}'$ was so mixed with the AN type polymer solution ($A_1$) obtained in Example 1 that the PEG content was 1.2% by weight. Each of the resulting mixtures was mix spun as in Example 1, and electrical resistivity was measured. The results are reported in Table 5.

Table 5

| Copolymer Grafted PAN on | PEG/PBA (%) | Spinnability* (m/min) | Electrical Resistivity (Ω cm) |
|---|---|---|---|
| $B_{25}'$ | 98/2 | 10.8 | $1.2 \times 10^{11}$ |
| $B_{26}'$ | 95/5 | 10.9 | $2.5 \times 10^9$ |
| $B_{27}'$ | 90/10 | 10.7 | $1.2 \times 10^9$ |
| $B_{28}'$ | 80/20 | 10.8 | $1.1 \times 10^9$ |
| $B_{29}'$ | 60/40 | 9.7 | $1.5 \times 10^9$ |
| $B_{30}'$ | 55/45 | 8.2 | — |

Note:
*Spinnability is expressed in terms of the maximum take-up speed within the range where no yarn breakage occurs, when the spinning solution is spun through a spinneret 400 holes having a diameter of 0.07 mm into 55% aqueous solution of DMSO at 20°C.

From the above results, it will be understood that when the composition ratio of PEG/PBA is too large, good antistatic properties are not obtained. On the other hand, when the composition ratio of PEG/PBA is too small, the copolymer is not likely to dissolve in DMSO, and spinnability is impeded.

Accordingly, the composition ratio of polyester to polyalkylene glycol has important significance.

In general, when the composition ratio of polyester is too small, the polycondensation with PEG is unlikely to proceed, a polyether-polyester block copolymer having only a low degree of polymerization is obtained, and the antistatic capabilities are reduced also.

EXAMPLE 6

Varying the charge ratio of AN upon graft copolymerizing AN using a polyether-polyester block copolymer ($B_{21}$) of PBA and PEG having a molecular weight of 4,000 synthesized as referred to in Example 4, tests were carried out.

100 parts of ($B_{21}$) were dissolved in 900 parts of DMSO. In the resulting solution AN was graft copolymerized at 50°C for 20 hours while varying the charge ratio of AN as shown in Table 6. At this time, DM was used as a chain transfer agent and 10 mmol/kg of APS were used as initiator. Each of the resulting graft copolymers was so mixed with the acrylic polymer ($A_1$) solution used in Example 1 that the PEG content became 1.8% by weight, and each of the resulting mixtures was spun under conditions as in Example 1. The results regarding electrical resistivity of each of the resulting fibers are reported in Table 6.

Table 6

| AN (parts)/$B_{21}$(100 parts) | Electrical Resistivity ($\Omega$ cm) |
| --- | --- |
| 3 | $7.0 \times 10^9$ |
| 5 | $2.2 \times 10^9$ |
| 10 | $1.4 \times 10^9$ |
| 20 | $4.7 \times 10^8$ |
| 40 | $5.4 \times 10^8$ |
| 50 | $1.0 \times 10^9$ |
| 60 | $2.2 \times 10^9$ |
| 70 | $6.3 \times 10^9$ |

From the above results, it will be understood that the composition ratio of AN toward a polyether-polyester block copolymer affects the antistatic properties. Especially within the range of 5–60 parts of AN based on 100 parts of the polyether-polyester block copolymer, excellent results are given.

EXAMPLE 7

Using the graft copolymer ($B_{22}'$) obtained in Example 4, the mix ratio of ($B_{22}'$) to the acrylic polymer solution ($A_1$) was varied.

The two were so mixed that the PEG content in the graft copolymer ($B_{22}'$) became those shown in Table 6, based on the entire mixed polymer, and each of the mixtures was spun. The results are reported in Table 7.

Table 7

| PEG content (wt %) | Electrical resistivity ($\Omega$ cm) |
| --- | --- |
| 0.05 | $1.2 \times 10^{12}$ |
| 0.1 | $8.0 \times 10^{10}$ |
| 0.3 | $9.8 \times 10^9$ |
| 1.0 | $9.5 \times 10^8$ |
| 2.0 | $1.3 \times 10^8$ |
| 4.0 | $8.3 \times 10^8$ |
| 8.0 | $7.5 \times 10^7$ |
| 12.0 | $5.1 \times 10^7$ |

From the above results, it is understood that in order to impart antistatic properties, it is necessary that the PEG content be at least 0.3% by weight. Of these samples, each of fibers whose PEG contents were 0.3, 2.0, 4.0, 8.0 and 12.0% by weight were spun, dyed and knitted to obtain final knitted goods.

As the PEG content increased, there was a tendency for firmness to disappear, and a sample whose PEG content was 12.0% lacked the firmness and the highly desired feel or hand of standard acrylic fibers was completely lost.

COMPARATIVE EXAMPLE 1

In order to clarify the effect of the present invention, comparison will now be made with the case of graft copolymerizing AN on PEG.

35 parts of a prepolymer of polyethylene adipate/azelate obtained in Example 4 and 70 parts of PEG (molecular weight about 4,000) were condensation polymerized to obtain a polyether-polyester block copolymer ($B_{31}$).

100 parts of this copolymer ($B_{31}$) were dissolved in 850 parts of DMSO. To the resulting solution were added 35 parts of AN, 0.5 part of oxalic acid, 10 parts of water, 1.5 parts of DM and 2.4 parts of APS. The entire mixture was graft copolymerized at 50°C for 18 hours to obtain a graft copolymer ($B_{31}'$).

Apart from the above, AN was graft copolymerized on PEG (molecular weight 4,000, 10,000, 20,000, 100,000, and 200,000) under exactly the same conditions.

Because PEG having a molecular weight of 100,000 and PEG having a molecular weight of 200,000 gelled during copolymerization, mix spinning was impossible. However, with reference to PEG having a molecular weight of 4,000 (abbreviated as PEG 4,000), PEG having a molecular weight of 10,000 (abbreviated as PEG 10,000) and PEG having a molecular weight of 20,000 (abbreviated as PEG 20,000), graft copolymers ($B_{32}'$)–($B_{34}'$) could be obtained, which were suitable for mixing.

Results of mix spinning these graft copolymers ($B_{31}'$)–($B_{34}'$) on the polymer ($A_1$) obtained in Example 1 so that the PEG contents became 1% by weight of the entire mixed polymer are shown in Table 8.

Table 8

| Graft Copolymer | | Electrical Resistivity ($\Omega$ cm) |
| --- | --- | --- |
| $B_{32}'$ | PEG 4,000 grafted PAN on | $2.1 \times 10^{13}$ |
| $B_{33}'$ | PEG 10,000 grafted PAN on | $6.2 \times 10^{12}$ |
| $B_{33}'$ | PEG 20,000 grafted PAN on | $2.1 \times 10^{12}$ |
| $B_{31}'$ | PEG Polyether-polyester block copolymer grafted PAN on (product of this invention) | $1.5 \times 10^9$ |

From the above results, it is apparent that the antistatic properties of a product of the present invention are particularly excellent.

COMPARATIVE EXAMPLE 2

In order to clarify the difference in effect of the present invention, results obtained by making a polymer antistatic using polyalkylene glycol methacrylate disclosed as in U.S. Pat. No. 3,507,935 are shown below.

In DMSO, methoxy polyethylene glycol methacrylate

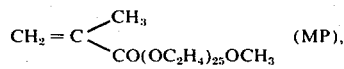

AN and SAS were copolymerized at composition ratios shown in Table 9 to obtain respective antistatic polymers. Results of mixing each of these polymers with the acrylic polymer ($A_1$) solution obtained in Example 1, so that the PEG content became 1% by weight of the entire mixed polymer, and spinning each of the resulting mixtures and the product of the present invention ($B_{28}'$) obtained in Example 5 are reported in Table 9.

Table 9

| Antistatic polymer | Blend Ratio of PEG (%) | Spinnability (m/min) | Maximum draw ratio (times) | Electrical Resistivity ($\Omega$ cm) |
|---|---|---|---|---|
| MP/AN/SAS (52/45/3) | 1 | 8.1 | 11.9 | $3.8 \times 10^{10}$ |
| MP/AN/SAS (65/30/5) | 1 | 9.2 | 12.3 | $7.5 \times 10^{10}$ |
| PBA/PEG grafted PAN on (product of this invention) | 0.5 | 11.0 | 14.1 | $6.2 \times 10^{9}$ |
| | 1.0 | 10.9 | 13.5 | $2.1 \times 10^{9}$ |

From the above results, it will be understood that the product of the present invention has remarkably superior antistatic properties when compared to the products of the prior art method of using polyalkylene glycol methacrylate derivative.

Moreover, the product of the present invention is drastically improved in spinnability and coloration, and an antistatic AN type fiber which is excellent from the viewpoint of production and quality is obtained according to the present invention.

We claim:

1. An antistatic acrylic fiber consisting essentially of a polymer composition which comprises: (a) a polymer (A) consisting of polyacrylonitrile only or being a copolymer containing at least 60 mol % of acrylonitrile and at least one other copolymerizable monofunctional vinyl monomer selected from the group consisting of acrylic acid, methacrylic acid or alkyl substitutes, thereof; α-substituted, β-substituted and nucleus substituted styrene; vinyl carboxylates, vinyl chloride, vinylidene chloride, vinyl acetate, vinyl benzoate and vinyl chloroacetate; 2-vinyl pyridine and 2-methyl-5-vinyl pyridine or alkyl substitutes thereof; N,N-dimethylamino methyl methacrylate, N,N-diethylamino ethyl methacrylate, alkenyl aromatic sulfonic acid, vinyl sulfonic acid, allyl sulfonic acid, methallyl sulfonic acid and salts thereof, (b) a polymer (B) a majority of which consists of a polyether-polyester block copolymer consisting of about 60–95% by weight of a compound represented by the general formula (1) and about 5–40% by weight of a linear saturated polyester based on dibasic acids and dihydric alcohols

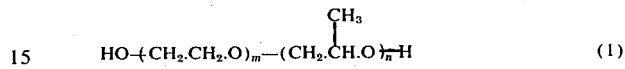

(wherein each of $m$ and $n$ is 0 or a positive integer, but if one is zero the other is a positive integer, $25 \leq m + n \leq 1000$ and $m \geq 10$), said linear saturated polyester being selected from the group consisting of polyethylene terephthalate, polyethylene adipate, polybutylene adipate, polybutylene terephthalate, polybutylene isophthalate, polyethylene azelate, polyethylene sebacate, polyethylene decandicarboxylate, polybutylene azelate, polybutylene sebacate, polyethylene terephthalate/adipate, polybutylene isophthalate/adipate, polyethylene adipate/azelate, polyethylene adipate/sebacate and polyethylene adipate/azelate/sebacate, said polymer composition containing about 0.3–10% by weight of said compound represented by the general formula (1), based on the total weight of the composition.

2. An antistatic acrylic fiber according to claim 1, wherein said polymer (B) is a polymer obtained by further graft copolymerizing a copolymerizable vinyl monomer consisting mainly of acrylonitrile on said polyether-polyester block copolymer consisting of about 60–95% by weight of said compound represented by the general formula (1) and about 5–40% by weight of said polyester.

3. An antistatic acrylic fiber according to claim 1, wherein said compound represented by said general formula (1) is polyethylene glycol.

4. An antistatic acrylic fiber according to claim 1 wherein said polyester in said polymer (B) is an aliphatic polyester selected from the group consisting of polyethylene adipate, polybutylene adipate, polyethylene azelate, polyethylene sebacate, polyethylene decandicarboxylate, polybutylene azelate, polybutylene sebacate, polyethylene adipate/azelate, polyethylene adipate/sebacate and polyethylene adipate/azelate/sebacate.

5. An antistatic acrylic fiber according to claim 4, wherein the acid component of said aliphatic polyester is one or more acids selected from the group consisting of adipic acid, azelaic acid and sebacic acid.

* * * * *